US006850528B1

(12) United States Patent
Crocker et al.

(10) Patent No.: US 6,850,528 B1
(45) Date of Patent: Feb. 1, 2005

(54) SYSTEM AND METHOD FOR MAINTAINING NETWORK SYSTEM INFORMATION

(75) Inventors: Kenneth Lynn Crocker, Issaquah, WA (US); Wei Jiang, Kirkland, WA (US); Gurdeep Singh Pall, Kirkland, WA (US); Bernard D. Aboba, Bellevue, WA (US); Narendra C. Gidwani, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/197,405

(22) Filed: Nov. 20, 1998

(51) Int. Cl.$^7$ ............................................... H04L 12/56
(52) U.S. Cl. ...................................... 370/401; 709/220
(58) Field of Search .............................. 370/252, 254, 370/400, 401, 402, 409, 411; 709/220, 223, 242, 224; 703/23, 27

(56) References Cited

U.S. PATENT DOCUMENTS

| | | | | |
|---|---|---|---|---|
| 5,812,819 A | * | 9/1998 | Rodwin et al. | ................ 703/23 |
| 5,881,246 A | * | 3/1999 | Crawley et al. | ............ 709/238 |
| 6,047,330 A | * | 4/2000 | Stracke, Jr. | ................. 709/238 |
| 6,052,788 A | * | 4/2000 | Wesinger et al. | ........... 713/201 |
| 6,067,407 A | * | 5/2000 | Wadsworth et al. | ..... 395/200.8 |
| 6,286,038 B1 | * | 9/2001 | Reichmeyer et al. | ....... 709/220 |
| 6,308,205 B1 | * | 10/2001 | Carcerano et al. | .......... 709/221 |
| 6,343,320 B1 | * | 1/2002 | Fairchild et al. | ............ 709/224 |
| 6,385,174 B1 | * | 5/2002 | Li | .............................. 370/252 |
| 6,412,003 B1 | * | 6/2002 | Melen | ........................ 709/225 |
| 6,516,000 B1 | * | 2/2003 | Kshirsagar et al. | ......... 370/410 |

OTHER PUBLICATIONS

Microsoft internal documentation, Mar. 24, 1998, from Windows NT Routing and Remote Access, on Router Identity Object and Enterprise Views of Routers in MMC, Viewing Domain.doc, pp. 1–10.

Microsoft internal documentation, Jan. 12, 1998, from Windows NT Routing and Remote Access, on Network Use of DS—Routing routds.doc, pp. 11.

Microsoft white paper from Windows NT Server, 1997, on Routing and Remote Access Service for Windows NT Server: New Opportunities Today and Looking Ahead, pp. 1–22.

Northrup, Anthony, NT Network Plumbing, 1998, Chapters 1 and 13 on Routers, Proxies, and Web Services.

Iseminger, David, Inside Windows NT Infrastructures, 1998, Chapters 4 and 5.

"Information Processing Systems –Open Systems Interconnection –The Directory: Overview of Concepts, Models, and Services." ISO/IEC JTC 1/SC21, International Standard 9594–1, 1992.

"Information Processing Systems –Open Systems Interconnection –The Directory: Selected Object Classes." Recommendation X.521 ISO/IEC JTC 1/SC21, International Standard 9594–7, 1994.

Wahl et al. "Lightweight Directory Access Protocol: Standard and Pilot Attribute Definitions." Internet Draft (work in progress). Oct., 1996.

(List continued on next page.)

*Primary Examiner*—Dang Ton
*Assistant Examiner*—Phuc Tran
(74) *Attorney, Agent, or Firm*—Leydig, Voit & Mayer, Ltd.

(57) ABSTRACT

A system for maintaining network information. The system resides in a network comprising a plurality of sub-networks in communication with one another over a communications backbone. Each sub-network has a router for use in performing communications with other sub-networks. A directory service is linked to the communications backbone and includes a database. The database stores router attribute information that is published by each of the routers. Using a query engine associated with the directory service, meaningful information can be gathered from the database as a function of specified router attribute information.

37 Claims, 5 Drawing Sheets

OTHER PUBLICATIONS

Yaacovi et al. "Lightweight Directory Access Protocol: Extensions for Dynamic Directory Services." Internet Draft (work in progress). Jun., 1996.

Meyer, D. "Representing Tunnels in RPSL." Internet Draft (work in progress). Nov., 1996.

Allaettinoglu et al. "Routing Policy Specification Language (RPSL)." Internet Draft (work in progress), Nov., 1996.

Allaettinoglu et al. "Application of Routing Policy Specification Language (RPSL) on the Internet." Internet Draft (work in progress). Mar., 1997.

Bates et al. "Representation of IP Routing Policies in a Routing Registry." Technical Report ripe–181, RIPE, RIPE NCC, Amsterdam, Netherlands. Oct., 1994.

Bates et al. "Representation of IP Routing Policies in the RIPE Database." Technical Report ripe–181, RIPE, RIPE NCC, Amsterdam, Netherlands. Feb., 1993.

Merit Network, Inc. "How to Register in RADB." Available online at www.radb.net/docs/register.html. Accessed May 2, 2000.

* cited by examiner-

SYSTEM AND METHOD FOR MAINTAINING NETWORK SYSTEM INFORMATION

TECHNICAL FIELD

This invention relates generally to computer network administration and, more particularly, relates to a system and method for maintaining network system information.

BACKGROUND OF THE INVENTION

The Open Systems Interconnection (OSI) model was developed by the International Standards Organization (ISO) in 1983 to provide a conceptual model on which networks could be based. Layer-3 of the OSI model, the network layer, defines how traffic gets across networks. More particularly, layer-3 defines an addressing scheme that includes both network and host addresses, mechanisms for traffic control, and often, a checksum. The most well-known examples of layer-3 protocols are NetBEUI, Internet Protocol (IP), Internet Control Message Protocol (ICMP), Internet Packet Exchange (IPX), and Asynchronous Transfer Mode (ATM).

The network layer allows any two systems to address each other, regardless of whether or not they are directly connected. In order to accomplish this, the network layer includes routing protocols, such as IS—IS, RIP, and OSPF. It also includes packet fragmentation and reassembly, which allows packets to traverse networks with different maximum packet sizes or Maximum Transfer Units (MTUs).

Network components that connect different networks and switch packets are called routers. The OSI model refers to them as Intermediate Systems (ISs), hence the routing protocol IS—IS. Routers by definition exist at the network layer. However, as network technology evolves, the distinct capabilities of bridges, routers, and switches merge into single devices. Accordingly, the term "router" is also contemplated to encompass routers that include these additional technologies.

For more information on networking and routers, the reader is referred to Northrup, A., *NT Network Plumbing, Routers, Proxies, and Web Services*, IDG Books World Wide, Inc. 1998 and Isemiger. D., *Inside Windows NT Infrastructures*, Wiley Computer Publishing, 1998.

To maintain the network layer in operation, administration is required. Typically, a network administrator performs on-going measurements of network utilization, router status, loads on servers, overall network performance and the like. To assist in this purpose, Microsoft's "WINDOWS NT" brand operating system includes a utility for configuring a network to include a directory service (DS). The DS maintains a list of routers and RAS servers within the network layer. By accessing the DS, the network administrator can view a listing of all routers and RAS servers within the network.

While the DS in its current implementation works for its intended purpose of maintaining a list of routers and RAS servers on the network, it is deficient in that it fails to provide any further information to a network administrator regarding the attributes of the routers or RAS servers. Furthermore, the DS fails to provide a means by which the network administrator can sort through the list of routers and RAS servers. Accordingly, a need exists for an administration tool that allows a network administrator to selectively access useful information concerning the components residing in the network layer.

SUMMARY OF THE INVENTION

In accordance with this need, the subject invention is generally realized in a system and method for maintaining network system information. The system and method resides in a network comprised of a plurality of sub-networks that are in communication with one another over a communications backbone. Each sub-network has a router for use in performing communications with other sub-networks. A directory service is linked to the communications backbone and includes a database. The database stores router attribute information that is published by each of the routers. Using a query engine associated with the directory service, meaningful information can be gathered from the database as a function of specified router attribute information.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
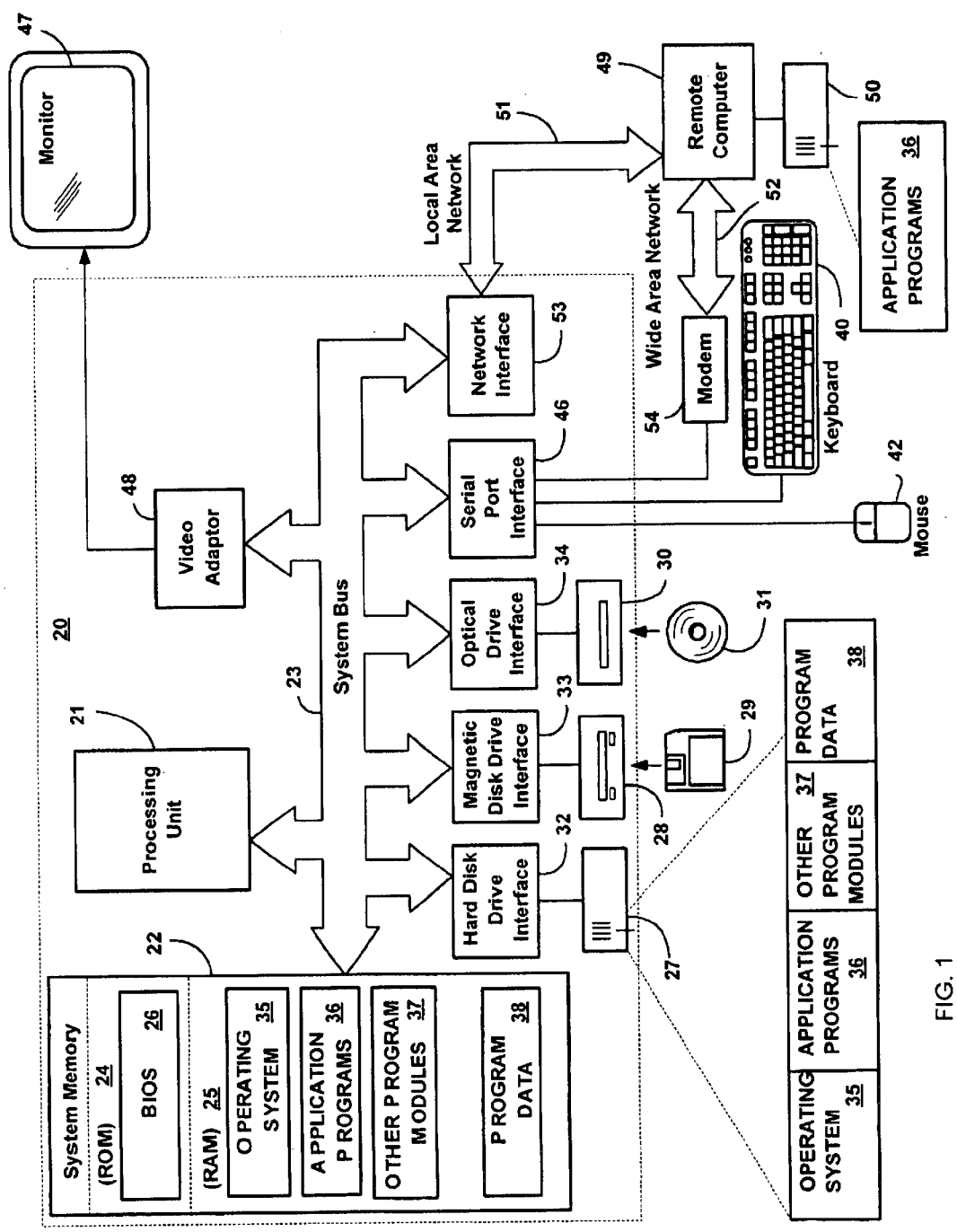
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, a system and method for maintaining network system information is provided. Generally, the information is maintained in a meaningful manner within a centralized database associated with a directory service (DS) attached to the network. Preferably, the information relates to attributes that routers and RAS servers (referred to collectively as "routers") attached to the network publish about themselves. It will be appreciated, however, that attribute information for other components residing within the network may also be maintained within the DS and, therefore, the invention is not intended to be limited by the description that follows. By querying the DS, a system administrator may gather information about the network components as a function of their attributes. Additionally, by maintaining the attribute information in a centralized locale, the information can be easily disseminated throughout the network, for example, to other DSs.

Figure 2:
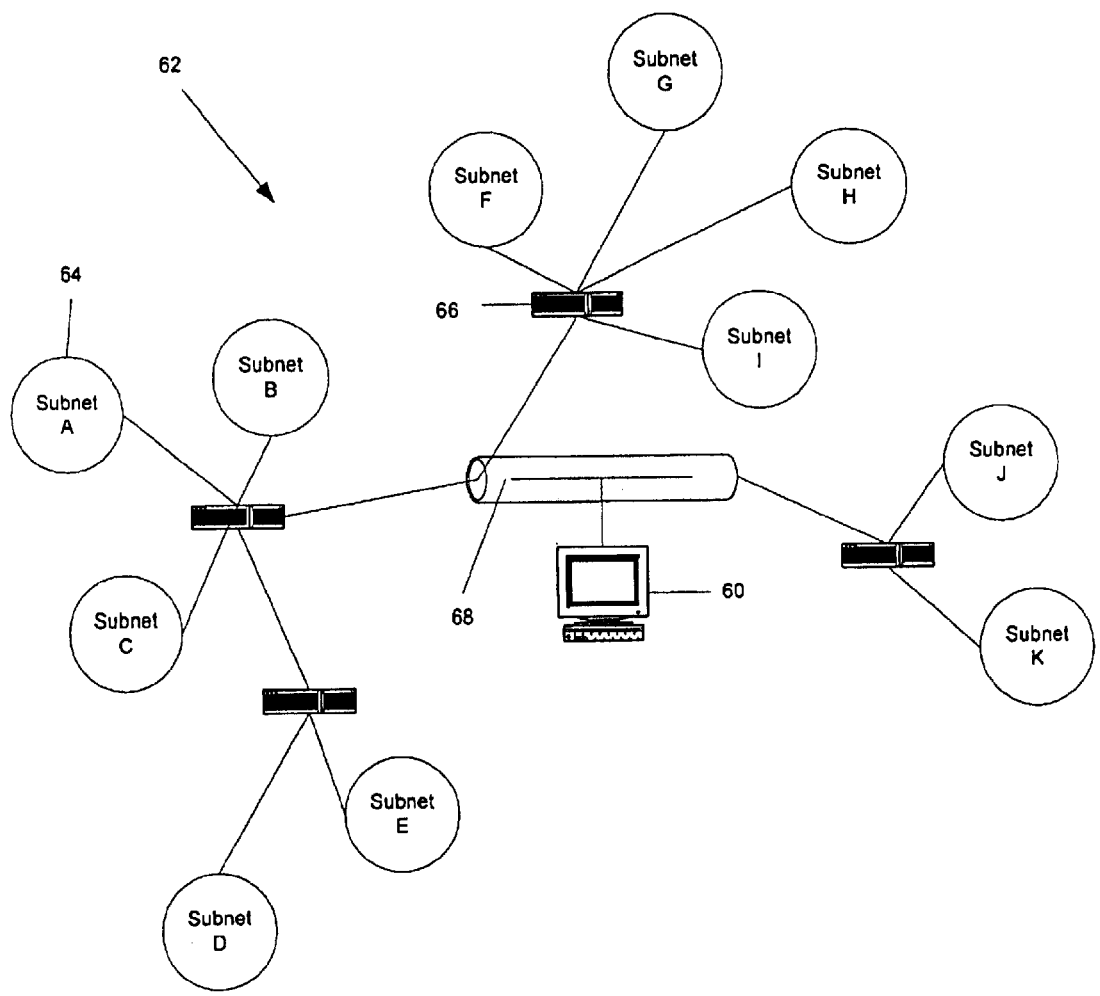
FIG. 2 is a block diagram of an exemplary computer network including the directory service that is the subject of the present invention.

As illustrated in FIG. 2, the DS 60 resides in a network 62 including a plurality of sub-networks 64, routers 66 and a backbone 68. As will be appreciated, the backbone 68 is provided to relieve network congestion by providing a high-speed or highly available path between the sub-networks 64. Preferably, the DS 60 is in direct communication with the backbone 68. In the exemplary network configuration 62, the routers 66 and the DS 60 are capable of communicating through the backbone 68 whereby the routers 66 can publish attribute information to the DS 60. Communications between the routers 66 and the DS 60 is preferably accomplished using the "*Routing Policy Specification Language (RSPL)*," the schema of which is described in greater detail in attached Appendix A.

Figure 3:
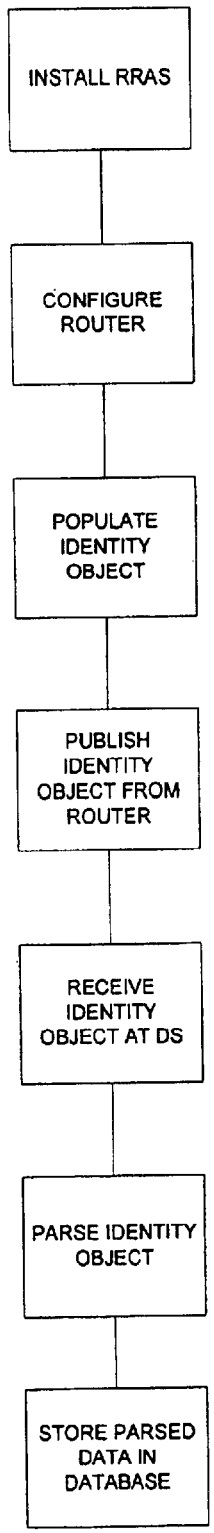
FIG. 3 is a flow chart diagram generally depicting the steps for maintaining network information in accordance with the invention.

For publishing attribute information from the router 66 to the DS 60, the routers 66 preferably include the "WINDOWS NT" brand operating system Routing and Remote Access Services (RRAS). With reference to FIG. 3, the RRAS is preferably installed on every router 66 in a disabled state such that the router service will likely need to be fully configured and running before network connectivity to the DS 60 can be established. Thereafter, once the router 66 is configured and attached to the network 62, the router broadcasts its attribute information over the network 62 where it is received by the DS 60. In response to the receipt of the broadcast message, the DS 60 may issue an acknowledgement to the router 66. In this manner, a direct communication link may be established between the DS 60 and the router 66.

For conveying the attribute information from the router 66 to the DS 60, a router identity object may be used. The router identity object preferably contains basic information characterizing a given router such as the RAS media, LAN media, DDR media, IP protocols, IPX protocols, NBF, and back end authentication method used by the router 66. An exemplary router identity object comprising data fields for maintaining router attribute information is shown below.

and its network connectivity, such as, information related to the name of the site router for DDR access, site prefixes, media and addresses, authentication type supported by the site router and network protocols supported by the site router for DDR access.

To populate the router identity object and/or reachability object, it is preferred that the attribute information concerning the router 66 be gathered and formatted into the appropriate object at the time the router 66 is setup or its configuration altered. For this purpose, the set-up and router administration tools associated with RRAS include functionality for collecting the required data and formatting the data for transmission to the DS 60. Those of skill in the art will recognize how the attribute information may be collected and formatted to create the appropriate objects and, therefore, for the sake of brevity, it will not be described further herein.

Additionally, the router 66 may periodically check its registration with the DS 60 and/or update the information

| ATTRIBUTE | SYNTAX | LENGTH | VALUES | MUST | COMMENTS |
|---|---|---|---|---|---|
| cn | string | >=1 | 1 | must | name of object |
| msplUnicastRoutingProtocols | Int32 | 4 | 0–1 | may | IP Unicast routing protocols installed |
| msplMulticastRoutingProtocols | Int32 | 4 | 0–1 | may | IP Multicast routing protocols installed |
| mslpxRoutingProtocols | Int32 | 4 | 0–1 | may | IPX Unicast routing protocols installed |
| msNetworkProtocols | Int32 | 4 | 0–1 | must | Running network protocols |
| msForwardingProtocols | Int32 | 4 | 1 | must | Network Protocols with forwarding on |
| msRouterRole | Int32 | 4 | 1 | must | RAS Server, Tunnel Server, DDR, LAN-LAN, NAT |
| msRouterMedia | Int32 | 4 | 1 | must | List of media |
| msRouterMedia | Int32 | 4 | 0–1 | may | Further list of media |
| msRouterAuth | Int32 | 4 | 1 | may | Type of auth (NT Domain, RADIUS) |
| msFilteringEnabled | Int32 | 4 | 1 | must | Whether filtering is on for various network protocols (IP, IPX). |

For supporting extensibility, the router identity object may further include a data field containing data representative of the manufacturer of the router 66. An exemplary field for use in connection with the router identity object is illustrated below.

stored in the DS 60. For this purpose, the router 66 preferably queues changes to the identity object before the identity object is forwarded to the DS 60. Similarly, if a router is disabled, an identity object is preferably issued from the router 66 to the DS 60 to notify the DS 60 that the router is

| ATTRIBUTE | SYNTAX | LENGTH | VALUES | MUST | COMMENTS |
|---|---|---|---|---|---|
| MsRRASAttribute | Int32 | >=1 | 1+ | must | Vendor attribute of syntax, vendor ID, Type Major, Type Minor |

The vendor ID may be an enterprise number that is managed by IANA. The Type Major vendor attribute and its representative field value may generally include the following: unicast (0); multicast (1); Microsoft Reserved (3,4); IPX (5) and Vendor Extension (6). The Type Minor vendor attribute and its representative field values may generally include the following: unicast protocol (definitions from RFC 2096); multicast protocol (definitions from multicast mib internet draft) and IPX protocol (definitions in SDK).

The router 66 may additionally publish to the DS 60 a site reachability object. The site reachability object is created when a demand dial interface is created on a router. The reachability object contains information characterizing a site no longer operational within the network 72 and that it should be removed from the database. Removal of a router 66 from the database may also be performed manually.

For maintaining the attribute information within the DS 60, the DS 60 preferably parses the received router identity object and/or reachability object. The parsed attribute information for each router that has reported to the DS 60 is then stored within corresponding database fields in the DS 60. This attribute information is thus available to be searched by a network administrator to create, for example, a console listing all routers having a specified attribute that the network administrator wishes to manage. Additionally, the attribute information can be searched to find routers for which remote configuration updates from the DS 60 are to be issued. The manner by which a router is to be updated could be issued to the router in a router identity object created at the DS 60 and issued to the router 66.

Figure 4:
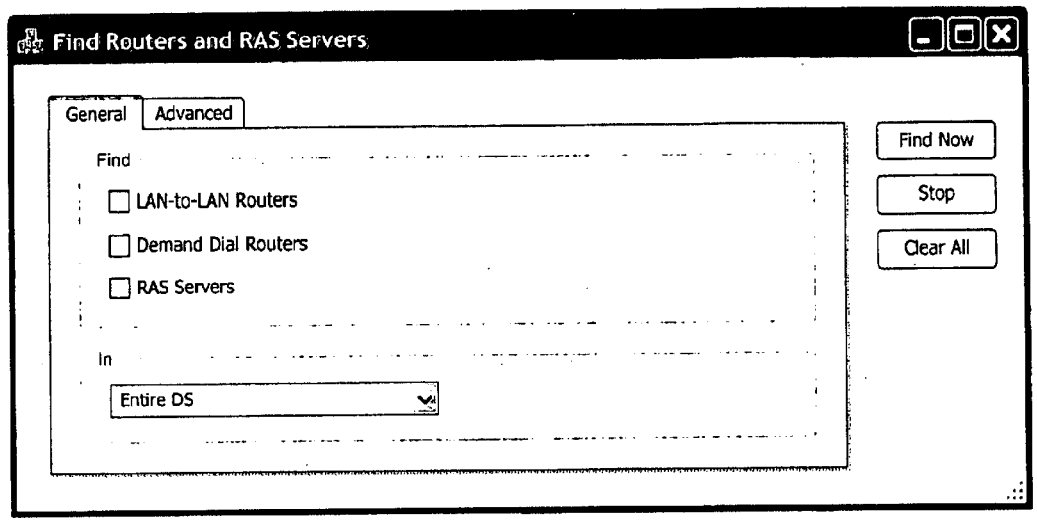
FIG. 4 is a screen shot of an exemplary query engine in the form of graphical user interface.
Figure 5:
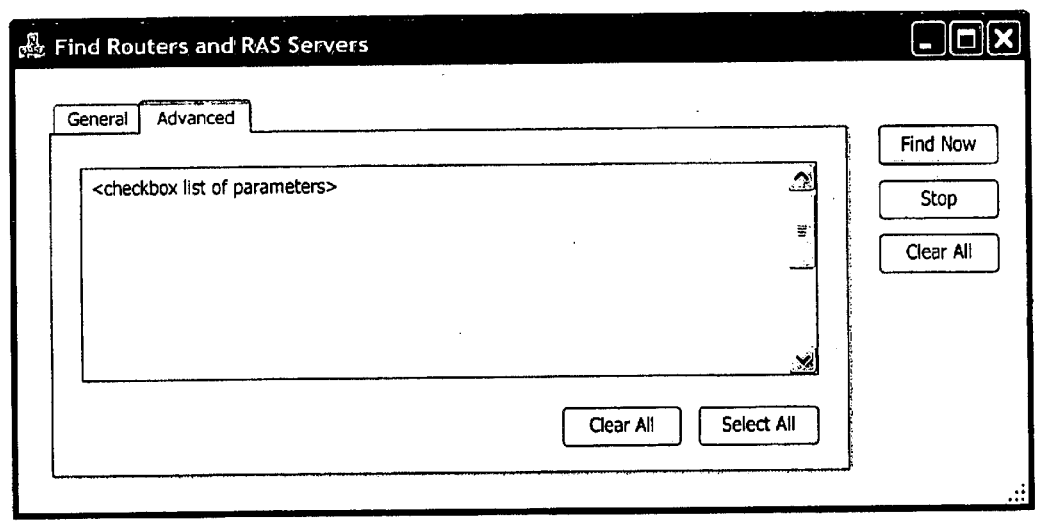
FIG. 5 is a further screen shot of the query engine illustrated in FIG. 4.

To search the database of the DS 60, a network administrator may be presented with a graphical user interface (GUI), such as illustrated in FIGS. 4 and 5, by which the network administrator can formulate a query to issue to the DS 60. The query preferably includes one or more attributes corresponding to the data fields maintained within the DS 60. In this manner, the DS 60 can search its database and return to the network administrator a list of only those routers having the queried attribute(s). For example, a query can be formulated to have the DS 60 return to the network administrator those routers that are LAN-to-LAN routers. Within the illustrated GUI, preformatted queries are available for searching unicast routing protocols, multicast routing protocols, IPX routing protocols, transports, router roles, router media, router authentication methods, and status of packet filtering. It will be appreciated that this attribute information is likewise published by the routers 66 and maintained within the DS 60.

Figure 6:
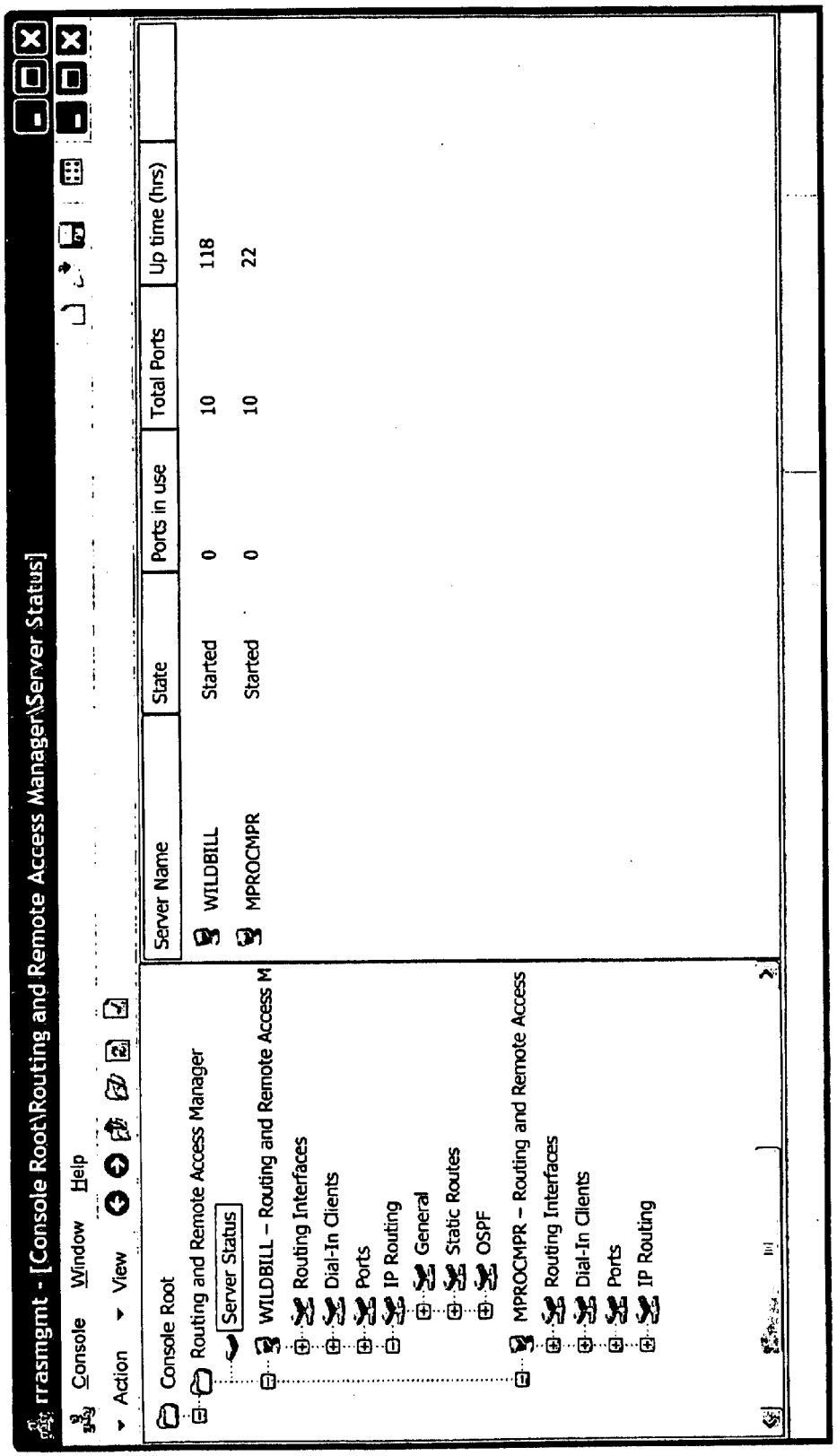
FIG. 6 is a screen shot of a console in which the results of a query are displayed.

The information returned from the DS 60 is preferably displayed to the network administrator in a console including a console Routing and Remote Access tree as illustrated in FIG. 6. By way of example only, the tree would include for each router returned to the console as a result of a query, the status of the router, the router name, and, stemming from the router name, a listing of the components under the router. As will be appreciated, the status information may include "started," "stopped," "not configured running," "not configured stopped," and "unreachable." It is further preferred that the queried attribute information tree be persisted such that the need to repeat queries is minimized.

It is also preferred that the network administrator be provided with the ability to interact with the console attribute information tree whereby routers can be manually added and/or removed from the listing. Upon adding a router to an attribute information tree, it is desired that a check be performed to ensure that the addition of the router will not result in a multiple listing for that router within the tree. Furthermore, when a new query is performed on an attribute for which an attribute information tree already exists, it is desired that any routers that were manually added to the preexisting attribute information tree be maintained in the new attribute information tree created from the new query.

All of the references cited herein and in Appendix A, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A system for maintaining network information, the system comprising:
    a network comprising a plurality of sub-networks in communication with one another over a communications backbone, each sub-network having a router linked to the communications backbone for use in performing communications with other sub-networks, each of the routers publishing router attribute information about itself over the communications backbone, the router attribute information comprising a router identity object, the router identity object comprising:
        a router role data field indicating a role of the network router; and
        a filtering enabled data field indicating whether the network router has filtering turned on for at least one network protocol that the network router is running;
    a directory service linked to the communications backbone having associated therewith a database, the database storing the published router attribute information for each of the routers; and
    a query engine associated with the directory service for gathering information from the database as a function of specified router attribute information, the query engine configured to, at least:
        accept a query of the database which includes a specified attribute of network routers; and
        return to the querier a list of network routers having the specified attribute; and
    wherein the directory service is configured to, at least, issue to one of the returned network routers a message including data representative of a desired configuration update to be performed by the network router.

2. The system as recited in claim 1, wherein the router attribute information comprises information representative of a routing protocol used by each router.

3. The system as recited in claim 1, wherein the router attribute information comprises information representative of a network communications protocol used by each router.

4. The system as recited in claim 1, wherein each of the routers publishing router attribute information about itself comprises publishing from the network router a message including data representative of a network communications protocol used by the router.

5. The system as recited in claim 1, wherein each of the routers publishing router attribute information about itself comprises publishing from the network router a message including data representative of a router protocol used by the router.

6. The system as recited in claim 1, wherein the router attribute information further comprises a reachability object.

7. The system as recited in claim 1, wherein the router identity object is created at the time the router is set up.

8. The system as recited in claim 1, wherein publishing router attribute information occurs periodically.

9. The system as recited in claim 1, wherein the role of the network router is selected from a group consisting of RAS server, Tunnel server, DDR server, LAN—LAN server and NAT server.

10. In a network comprised of a plurality of sub-networks in communication with one another over a communications backbone, a method for maintaining network systems information comprising the steps of:
    publishing over the communications backbone a message from a network router within one of the sub-networks including data representative of attributes of the network router, the data representative of attributes of the network router comprising a router identity object, the router identity object comprising:
        a router role data field indicating a role of the network router; and
        a filtering enabled data field indicating whether the network router has filtering turned on for at least one network protocol that the network router is running;

receiving at a directory service in communication with the backbone the message;

parsing the message to extract the data representative of the attributes of the network router;

storing the extracted data in a database associated with the directory service;

accepting a query of the database which includes a specified attribute of the network router;

returning to the querier a list of the network routers having the specified attribute; and issuing to one of the returned network routers a message including data representative of a desired configuration update to be performed by the network router.

11. The method as recited in claim 10, wherein the step of publishing comprises the step of publishing from the network router a message including data representative of a network communications protocol used by the router.

12. The method as recited in claim 10, wherein the step of publishing comprises the step of publishing from the network router a message including data representative of a router protocol used by the router.

13. The method as recited in claim 10, wherein the step of publishing comprises the step of publishing from the network router a router identity object.

14. The method as recited in claim 13, further comprising the step of creating the router identity object at the time the router is set up.

15. The method as recited in claim 10, wherein the step of publishing comprises the step of publishing from the network router a reachability object.

16. The method as recited in claim 10, wherein the step of publishing occurs periodically.

17. The method as recited in claim 10, wherein the data representative of attributes of the network router further comprises information representative of a routing protocol used by the network router.

18. The method as recited in claim 10, wherein the data representative of attributes of the network router further comprises information representative of a network communications protocol used by the network router.

19. The method as recited in claim 10, wherein the role of the network router is selected from a group consisting of RAS server, Tunnel server, DDR server, LAN—LAN server and NAT server.

20. A computer-readable medium having stored thereon router attribute information for a network router, the router attribute information published by the network router, the router attribute information comprising a router identity object, the router identity object comprising;

at least one routing protocols data field, each routing protocols data field indicating at least one routing protocol installed on the network router;

a network protocols data field indicating at least one network protocol that the network router is running;

a router role data field indicating a role of the network router; and a filtering enabled data field indicating whether the network router has filtering turned on for at least one of said at least one network protocol that the network router is running; and wherein a database is capable of storing router attribute information published by network routers, a query of the data base is capable of including a specified attribute of network routers, a list of network routers having the specified attribute is capable of being returned to a querier, and a message including data representative of a desired configuration update to be performed by the network router is capable of being issued to one of the returned network routers.

21. The computer-readable medium as recited in claim 10, wherein the role of the network router is selected from a group consisting of RAS server, Tunnel server, DDR server, LAN—LAN server and NAT server.

22. The computer-readable medium as recited in claim 20, wherein publishing router attribute information comprises publishing a message including router attribute information.

23. The computer-readable medium as recited in claim 20, wherein the router attribute information further comprises a reachability object.

24. The computer-readable medium as recited in claim 20, wherein the router identity object is created at the time the router is set up.

25. The computer-readable medium as recited in claim 20, wherein the router attribute information is published periodically.

26. A system for maintaining network information, the system comprising:

a network comprising a plurality of sub-networks in communication with one another over a communications backbone, each sub-network having a router linked to the communications backbone for use in performing communications with other sub-networks, each of the routers publishing router attribute information about itself over the communications backbone, the router attribute information comprising:

a reachability object for the sub-network containing the network router; and a router identity object, the router identity object comprising a filtering enabled data field indicating whether the network router has filtering turned on for at least one network protocol that the network router is running;

a directory service linked to the communications backbone having associated therewith a database, the database storing the published router attribute information for each of the routers; and a query engine associated with the directory service for gathering information from the database as a function of specified router attribute information, the query engine configured to, at least:

accept a query of the database which includes a specified attribute of network routers; and return to the querier a list of network routers having the specified attribute; and wherein the directory service is configured to, at least, issue to one of the returned network routers a message including data representative of a desired configuration update to be performed by the network router.

27. The system as recited in claim 26, wherein each of the routers publishing router attribute information about itself comprises publishing from the network router a message including data representative of a network communications protocol used by the router.

28. The system as recited in claim 26, wherein each of the routers publishing router attribute information about itself comprises publishing from the network router a message including data representative of a router protocol used by the router.

29. The system as recited in claim 26, wherein the router identity object is created at the time the router is set up.

30. The system as recited in claim 26, wherein publishing router attribute information occurs periodically.

31. The system as recited in claim 26, wherein the router identity object further comprises a router role data field indicating a role of the network router.

32. The system as recited in claim 31, wherein the role of the network router is selected from a group consisting of RAS server, Tunnel server, DDR server, LAN—LAN server and NAT server.

33. In a network comprised of a plurality of sub-networks in communication with one another over a communications backbone, a method for maintaining network systems information comprising the steps of:

publishing over the communications backbone a message from a network router within one of the sub-networks including data representative of attributes of the network router, the data representative of attributes of the network router comprising:

a reachability object for the sub-network containing the network router; and a router identity object, the router identity object comprising a filtering enabled data field indicating whether the network router has filtering turned on for at least one network protocol that the network router is running;

receiving at a directory service in communication with the backbone the message;

parsing the message to extract the data representative of the attributes of the network router;

storing the extracted data in a database associated with the directory service;

accepting a query of the database which includes a specified attribute of the network router;

returning to the querier a list of the network routers having the specified attribute; and issuing to one of the returned network routers a message including data representative of a desired configuration update to be performed by the network router.

34. The method as recited in claim 33, wherein the data representative of attributes of the network router further comprises information representative of a routing protocol used by the network router.

35. The method as recited in claim 33, wherein the data representative of attributes of the network router further comprises information representative of a network communications protocol used by the network router.

36. The method as recited in claim 33, wherein the router identity object further comprises a router role data field indicating a role of the network router.

37. The method as recited in claim 36, wherein the role of the network router is selected from a group consisting of RAS server, Tunnel server, DDR server, LAN—LAN server and NAT server.

\* \* \* \* \*